US009391935B1

(12) United States Patent
Gunda (10) Patent No.: US 9,391,935 B1
(45) Date of Patent: Jul. 12, 2016

(54) TECHNIQUES FOR FILE CLASSIFICATION INFORMATION RETENTION

(75) Inventor: Laxmikant V. Gunda, Pune (IN)

(73) Assignee: Veritas Technologies LLC, Mountain View, CA (US)

(*) Notice: Subject to any disclaimer, the term of this patent is extended or adjusted under 35 U.S.C. 154(b) by 263 days.

(21) Appl. No.: 13/329,740

(22) Filed: Dec. 19, 2011

(51) Int. Cl.
*G06F 15/16* (2006.01)
*H04L 12/58* (2006.01)
*G06F 17/30* (2006.01)

(52) U.S. Cl.
CPC .......... *H04L 51/08* (2013.01); *G06F 17/30997* (2013.01)

(58) Field of Classification Search
CPC .... H04L 12/58; H04L 51/08; G06F 17/30997
USPC ............. 709/206; 707/698, E17.107; 706/47; 705/35
See application file for complete search history.

(56) References Cited

U.S. PATENT DOCUMENTS

| | | | | |
|---|---|---|---|---|
| 5,613,108 A * | 3/1997 | Morikawa | ............ | G06Q 10/107 |
| 5,701,466 A * | 12/1997 | Yong | ................. | G06F 17/30389 |
| 5,749,079 A * | 5/1998 | Yong | ................. | G06F 17/30389 |
| 6,628,194 B1 * | 9/2003 | Hellebust | ............ | H04M 19/041 340/7.5 |
| 6,757,712 B1 * | 6/2004 | Bastian | .............. | B64D 11/0015 709/203 |
| 7,237,009 B1 * | 6/2007 | Fung | ....................... | G06Q 10/00 709/206 |
| 7,822,725 B2 * | 10/2010 | Walliser | .............. | G06F 11/1451 707/651 |
| 8,006,200 B2 * | 8/2011 | Griffith | .................. | G06Q 30/02 705/14.4 |
| 8,244,679 B1 * | 8/2012 | Bilsborough | ....... | G06F 17/3015 707/640 |
| 2002/0078158 A1 * | 6/2002 | Brown | .................. | H04L 12/583 709/206 |
| 2002/0138579 A1 * | 9/2002 | Goldberg | ............. | G06Q 10/107 709/206 |
| 2003/0126136 A1 * | 7/2003 | Omoigui | ............. | G06F 17/3089 |
| 2004/0177057 A1 * | 9/2004 | Fairchild | ........... | G06F 17/30554 |
| 2005/0198166 A1 * | 9/2005 | Kawaji | ................. | G06Q 10/107 709/206 |
| 2006/0095527 A1 * | 5/2006 | Malik | ..................... | H04L 51/08 709/206 |
| 2006/0224679 A1 * | 10/2006 | Kikuchi | ............... | G06Q 10/107 709/206 |
| 2007/0067397 A1 * | 3/2007 | Tran | ..................... | G06Q 10/107 709/206 |
| 2007/0112742 A1 * | 5/2007 | Dumais | ............. | G06F 17/30613 |
| 2008/0049249 A1 * | 2/2008 | Tomita | .................. | G06F 3/0486 358/1.15 |
| 2008/0126431 A1 * | 5/2008 | Walliser | .............. | G06F 11/1451 |
| 2008/0244010 A1 * | 10/2008 | Singh | ..................... | G06F 15/16 709/206 |
| 2008/0263112 A1 * | 10/2008 | Shaath | .............. | G06F 17/30085 |
| 2009/0006233 A1 * | 1/2009 | Chemtob | ............... | G06Q 20/02 705/35 |
| 2009/0259673 A1 * | 10/2009 | Choi | ................. | G06F 17/30616 |
| 2010/0036789 A1 * | 2/2010 | Marleau | ............ | G06F 17/30705 706/47 |
| 2010/0036832 A1 * | 2/2010 | Griffith | ............ | G06F 17/30964 707/608 |
| 2010/0037172 A1 * | 2/2010 | Griffith | .................. | G06Q 30/02 715/777 |
| 2010/0169274 A1 * | 7/2010 | Kulkarni | ........... | G06F 17/30312 707/609 |
| 2010/0174761 A1 * | 7/2010 | Longobardi | ......... | G06Q 10/107 707/809 |
| 2010/0274750 A1 * | 10/2010 | Oltean | .............. | G06F 17/30115 706/47 |

(Continued)

FOREIGN PATENT DOCUMENTS

| | | | | |
|---|---|---|---|---|
| EP | 1087315 A2 * | 3/2001 | ........... | G06Q 10/107 |
| EP | 1244021 A1 * | 9/2002 | .............. | G06F 13/00 |
| JP | 2010233117 A * | 10/2010 | | |

*Primary Examiner* — Viet Vu
*Assistant Examiner* — Michael A Chambers
(74) *Attorney, Agent, or Firm* — Wilmer Cutler Pickering Hale and Dorr LLP (57) ABSTRACT

Techniques for file classification information retention are disclosed. In one particular exemplary embodiment, the techniques may be realized as a method for file classification information retention comprising receiving an indication of creation of an email attachment, determining, using at least one computer processor, whether to extract file classification information for the email attachment, and in the event file classification information is extracted, storing the extracted file classification information in association with the email.

20 Claims, 5 Drawing Sheets

(56) References Cited

U.S. PATENT DOCUMENTS

| | | | | |
|---|---|---|---|---|
| 2011/0161327 A1* | 6/2011 | Pawar | ............... | G06F 17/30997 707/741 |
| 2012/0011192 A1* | 1/2012 | Meister | ................ | G06Q 10/107 709/203 |
| 2012/0030224 A1* | 2/2012 | Cohen | ............... | G06F 17/30899 707/758 |
| 2013/0080641 A1* | 3/2013 | Lui | ......................... | G06F 9/505 709/226 |
| 2013/0297604 A1* | 11/2013 | Sutedja | ............... | G06Q 10/107 707/737 |

* cited by examiner

TECHNIQUES FOR FILE CLASSIFICATION INFORMATION RETENTION

FIELD OF THE DISCLOSURE

The present disclosure relates generally to file classification information and, more particularly, to techniques for file classification information retention.

BACKGROUND OF THE DISCLOSURE

Files may be classified by one or more applications to provide metadata related to one or more attributes such as, for example, an owner of a file, a group associated with a file, a location associated with a file, content of a file, or other file attributes. File classification information may or may not be stored in the file itself. For example, file classification data for a particular file may be stored as metadata or tags in the particular file or file classification data may be stored in cloud-based storage, database storage, a file system Alternate Data Stream (ADS), or other external storage. File classification information may be useful for backup, archive, and other purposes. However, when a file is attached to an email, file classification information may be lost. For example, an archive management application may not have access to file classification information for an email attachment when the file classification information is stored in cloud-based storage, database storage, a file system Alternate Data Stream (ADS), or other external storage, because such external file classification information may not be included in the email or the attachment. Furthermore, even when file classification information for an email attachment is stored in the email attachment itself, access to the file classification information may be lost. For example, different applications may store file classification information in different formats and/or different locations within a file, so an application attempting to access file classification information may not know how to access it.

In view of the foregoing, it may be understood that there may be significant problems and shortcomings associated with current file classification information retention technologies.

SUMMARY OF THE DISCLOSURE

Techniques for file classification information retention are disclosed. In one particular exemplary embodiment, the techniques may be realized as a method for file classification information retention comprising receiving an indication of creation of an email attachment, determining, using at least one computer processor, whether to extract file classification information for the email attachment, and in the event file classification information is extracted, storing the extracted file classification information in association with the email.

In accordance with other aspects of this particular exemplary embodiment, the file classification information may comprise information stored using Microsoft File Classification Infrastructure.

In accordance with further aspects of this particular exemplary embodiment, the determination may comprise a determination of whether the email attachment type is a file type for which file classification information is stored internal to the email attachment, wherein file classification information is extracted for an email attachment having file classification information stored external to the email attachment.

In accordance with additional aspects of this particular exemplary embodiment, file classification information may be extracted for the email attachment using an API.

In accordance with additional aspects of this particular exemplary embodiment, storing the extracted file classification information in association with the email may comprise storing the information in Messaging Application Programming Interface (MAPI) properties of the email.

In accordance with additional aspects of this particular exemplary embodiment, file classification information may be extracted from storage external to the email and the storage external to the email comprises at least one of: cloud-based storage, database storage, and a file system Alternate Data Stream (ADS).

In accordance with additional aspects of this particular exemplary embodiment, the email attachment may comprise an email attachment having an extension of a Microsoft Office Application and the file classification information may be extracted from the attachment.

In accordance with additional aspects of this particular exemplary embodiment, the email attachment file may comprise a third party application using a File Classification Infrastructure (FCI) API to store file classification information internal to the email attachment.

In accordance with additional aspects of this particular exemplary embodiment, the techniques may include receiving a request for the file classification information associated with the email, retrieving the file classification information associated with the email, and providing the file classification information to a requester.

In accordance with additional aspects of this particular exemplary embodiment, the requester may comprise at least one of: data loss prevention software, anti-virus software, encryption software, archive management software, backup management software, and indexing software.

In accordance with additional aspects of this particular exemplary embodiment, retrieving the file classification information associated with the email may comprise retrieving the file classification information from MAPI properties associated with the email.

In accordance with additional aspects of this particular exemplary embodiment, retrieving the file classification information associated with the email may comprise retrieving the file classification information from the email attachment.

In accordance with additional aspects of this particular exemplary embodiment, retrieving the file classification information associated with the email may comprise retrieving the file classification information from electronic storage external to the email and the attachment.

In accordance with additional aspects of this particular exemplary embodiment, the file classification information may be used for at least one of: determining an expiration date of the email; determining an archival storage platform for the email; determining a backup storage platform for the email; determining an encryption level for the email; making a replication decision for the email; and making a security decision for the email.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for file classification information retention, the article of manufacture comprising at least one non-transitory processor readable medium and instructions stored on the at least one medium. The instructions may be configured to be readable from the at least one medium by at least one processor and thereby cause the at least one processor to operate so as to receive an indication of creation of an email attachment, determine whether to extract file classification information for the email attachment, and in the event file classification information is extracted, store the extracted file classification information in association with the email.

In yet another particular exemplary embodiment, the techniques may be realized as a system for file classification information retention comprising one or more processors communicatively coupled to a network. The one or more processors may be configured to receive an indication of creation of an email attachment, determine whether to extract file classification information for the email attachment, and in the event file classification information is extracted, store the extracted file classification information in association with the email.

In accordance with additional aspects of this particular exemplary embodiment, the determination may comprise a determination of whether the email attachment type is a file type for which file classification information is stored internal to the email attachment, wherein file classification information is extracted for an email attachment having file classification information stored external to the email attachment.

In accordance with additional aspects of this particular exemplary embodiment, storing the extracted file classification information in association with the email may comprise storing the information in Messaging Application Programming Interface (MAPI) properties of the email.

In accordance with additional aspects of this particular exemplary embodiment, file classification information may be extracted from storage external to the email and the storage external to the email comprises at least one of: cloud-based storage, database storage, and a file system Alternate Data Stream (ADS).

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
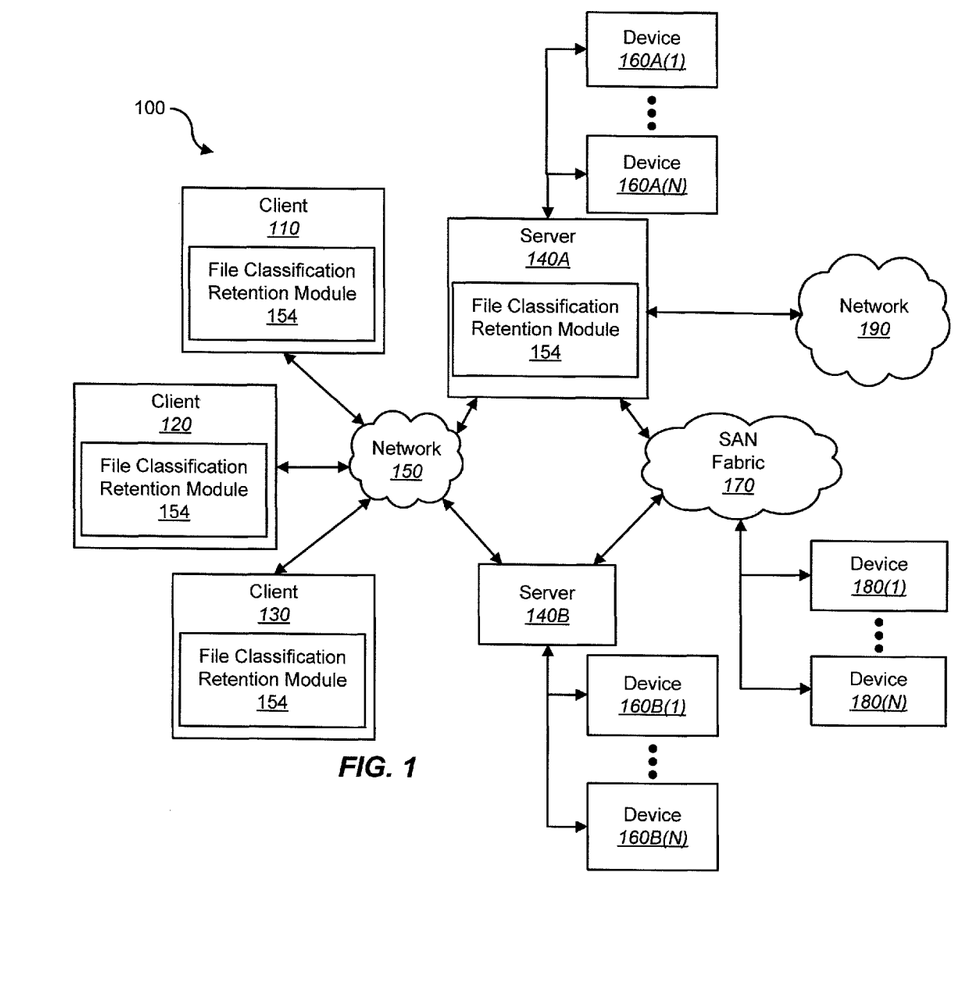
FIG. 1 shows a block diagram depicting a network architecture for file classification information retention in accordance with an embodiment of the present disclosure.

FIG. 1 shows a block diagram depicting a network architecture 100 for file classification information retention in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., file classification information retention module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
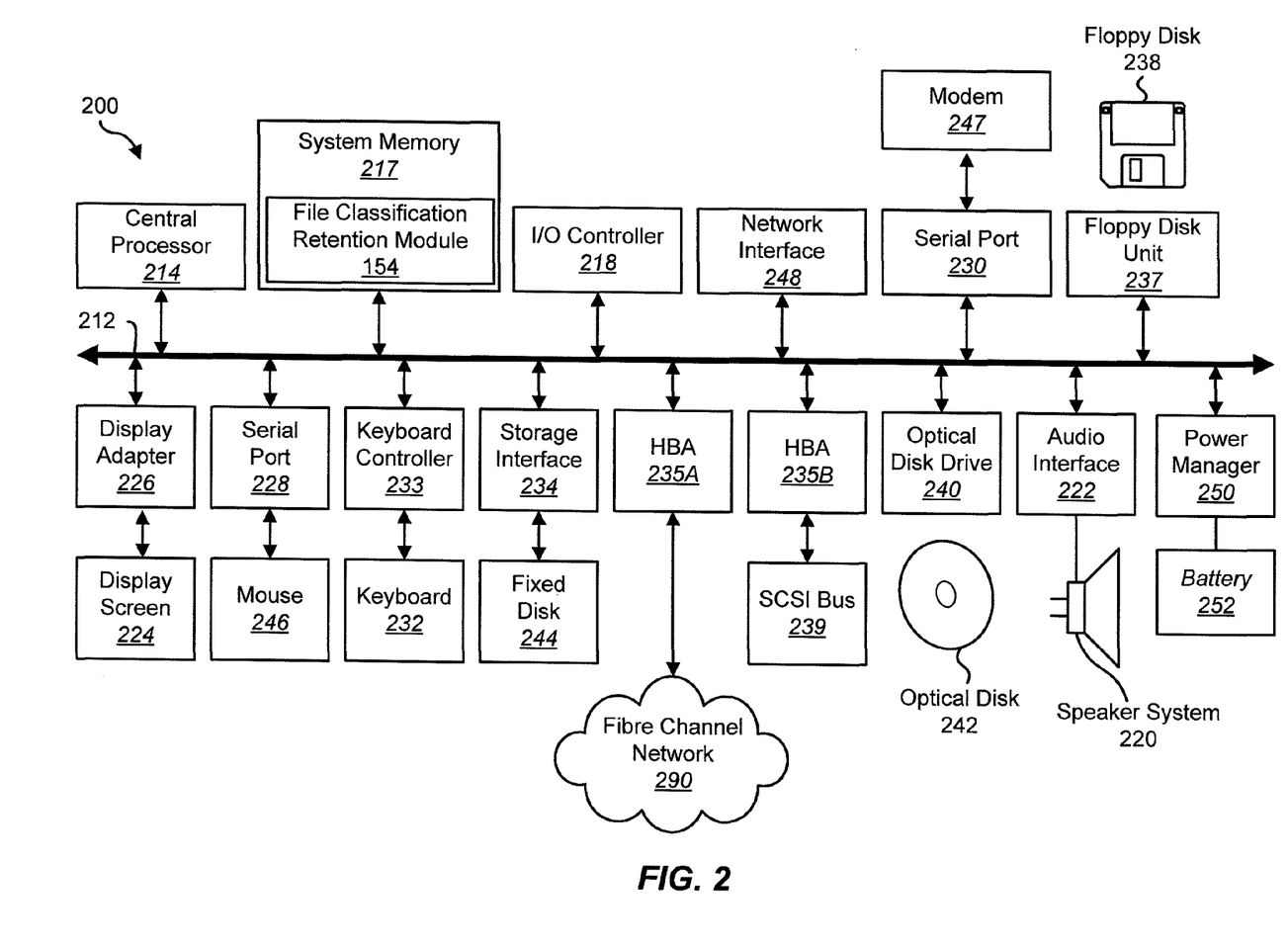
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for file classification information retention such as, for example, file classification information retention module 154. As illustrated, one or more portions of file classification information retention module may reside at a network centric location. For example, server 140A may be a server, a firewall, a gateway, or other network element that may perform one or more actions to retain file classification information. According to some embodiments, network 190 may be an external network (e.g., the Internet) and server 140A may be a gateway or firewall between one or more internal components and clients and the external network.

File classification information retention module 154 may detect attachment of a file to an email, an instant message, a web posting, or other electronic communication. File classification information retention module 154 may analyze an attachment and/or external data for to identify file classification information. For example, according to one or more embodiments, file classification information may be stored using Microsoft's File Classification Infrastructure™ (FCI). In such embodiments, file classification information may be retrieved from an attachment using a FCI Application Programming Interface (API).

According to some embodiments, file classification information retention module 154 may retrieve file classification information whether the file classification information is internal to the file or external to the file. For example, file classification information retention module 154 may use an API or other method to retrieve classification information stored in a file itself. File classification information retention module 154 may have information identifying a format, location, and other access information for file classification information based on a file type or other attributes. For example, a certain file type may store file classification information such as, for example, file classification tags or metadata in the same place and the same format for every file (e.g., a file type of "xyz" may store file classification tags in a specific field header of a file in XML format, a second file type may use an ordered list or a string to store classification information). File classification information retention module 154 may contain a lookup table or other data structure mapping one or more file attributes (e.g., a file type) with access information permitting retrieval of file classification information. According to some embodiments, file classification information retention module 154 may receive access information (e.g., a data structure/format of file classification information, a location, and/or parsing or retrieval instructions) from an external source. According to some embodiments, file classification information retention module 154 may use an API to transparently access file classification information in one or more locations.

File classification information retention module 154 may retrieve file classification information for an email attachment from storage external to the email. For example, storage external to the email may include or more of cloud-based storage, database storage, and a file system Alternate Data Stream (ADS).

File classification information retention module 154 may retrieve file classification information at one or more times. File classification information retention module 154 may retrieve file classification information as soon attachment of a file to an email is detected, insertion of a file into an instant message is detected, insertion of a file into a web posting is detected, or insertion of a file into another form of electronic communication is detected. Capturing file classification information while an original source file is being attached or inserted into a communication may preserve file classification information that may otherwise be lost. For example, file classification information for a document that is stored using Microsoft's FCI™ may be lost when a document is attached as an email. Thus, detection of an attachment and capturing of classification information may prevent such loss.

According to some embodiments, file classification information retention module 154 may determine whether to extract file classification information for the email attachment. The determination may be based at least in part on a determination of whether an email attachment type is a file type for which file classification information is stored internal to the email attachment or external to the email attachment. For example, some email attachments may use Microsoft's FCI™ to store classification information. Microsoft's FCI™ may store classification information internal to a document being classified when the document is a Microsoft Office™ document type (e.g., Microsoft Word™, Powerpoint™, etc.) Microsoft's FCI may, by default, store file classification information externally (e.g., in a file system Alternate Data Stream (ADS)) for other file types. Thus, file classification information retention module 154 may be able to determine based on a file type that classification data is internally stored. According to some embodiments, file classification information retention module 154 may retrieve file classification information when an attachment or insertion of a file in an electronic communication is detected and when the file type is a type which may not store file classification information in the attachment.

Retrieved file classification information may be stored by file classification information retention module 154 in one or more locations so that such information is accessible for later use. For example, file classification information retention module 154 may store file classification information in Messaging Application Programming Interface (MAPI) properties of the email. According to some embodiments, file classification information retention module 154 may store file classification information in other locations such as a database and/or network accessible storage.

According to some embodiments, file classification information retention module 154 may defer retrieval of file classification information if it is known that such information may be retrieved later. For example, file classification information retention module 154 may detect an email attachment, determine that it is a file type that stores classification information internal to the file, a defer retrieval of the file classification information until needed. Document types other than Microsoft Office™ documents may also store classification information internally. For example, third party vendors may use a Microsoft File Classification Infrastructure (FCI) API to store classification information in a file being classified. Additionally, other classification software and/or systems may provide internal metadata or classification tags.

File classification information may also be stored externally such as, for example, in cloud-based storage, database storage, a file system Alternate Data Stream (ADS), or other electronic storage. According to some embodiments, if file classification information retention module 154 determines that such classification information is accessible later, retrieval of such information may be deferred. According to some embodiments, location information may be associated with the email or other electronic communication to which the classified file is attached. For example, an email with an attached document may have the location of external classification information inserted into MAPI properties of the email (e.g., a network storage location or address, database information, etc.).

According to one or more embodiments, file classification information for an email attachment may always be extracted and associated with an email (e.g., inserted into MAPI properties of the email).

According to some embodiments, file classification information retention module 154 may also receive and handle requests for file classification information. For example, an email may be processed by one or more applications which use classification information. Such applications may include, for example, data loss prevention software, anti-virus software, encryption software, archive management software, backup management software, replication software, and indexing software. For example, encryption software may use file classification information to determine a level of encryption to apply to a file. Archive management software may use file classification information to determine whether to store a file in near-line storage, in off-line storage, or on another storage platform. Archive management software may also use file classification information to determine how long to retain a file or whether a file may be expired. File classification information retention module 154 may retrieve file classification information from one or more locations (e.g., an email attachment, MAPI properties of an email, and/or an external electronic storage location) in response to a request for such information.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, file classification information retention module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
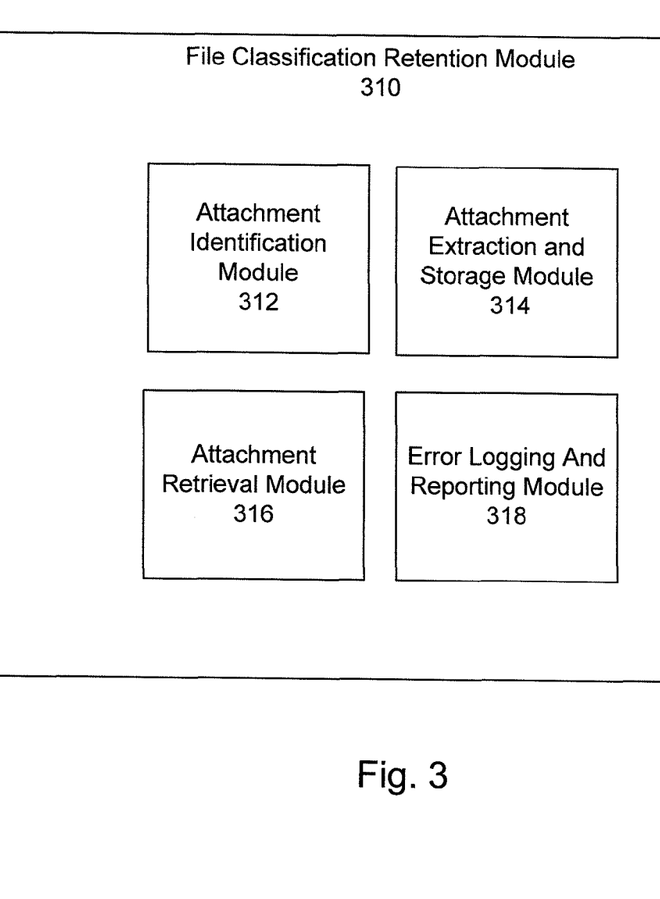
FIG. 3 shows a module for file classification information retention in accordance with an embodiment of the present disclosure.

Referring to FIG. 3, there is shown a file classification information retention module 310 in accordance with an embodiment of the present disclosure. As illustrated, the file classification information retention module 310 may contain one or more components including attachment identification module 312, attachment extraction and storage module 314, attachment retrieval module 316, and error logging and reporting module 318.

The description below describes network elements, computers, and/or components of a system and method for file classification information retention that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Attachment identification module 312 may detect an attachment of a file to an email, an instant message, a web posting, or other electronic communication. Attachment identification module 312 may analyze an attachment and/or external data to identify file classification information. For example, attachment identification module 312 may look at one or more file attributes such as, for example, a file type. Attachment identification module 312 may provide attachment information to attachment extraction and storage module 314.

Attachment extraction and storage module 314 may determine whether to extract and store file classification information upon detection or at a later time. Attachment extraction and storage module 314 may retrieve file classification information as soon attachment of a file to an email is detected, insertion of a file into an instant message is detected, insertion of a file into a web posting is detected, or insertion of a file into another form of electronic communication is detected. Capturing file classification information while an original source file is being attached or inserted into a communication may preserve file classification information that may otherwise be lost. For example, file classification information for a document that is stored using Microsoft's FCI™ may be lost when a document is attached as an email. Thus, detection of an attachment and capturing of classification information may prevent such loss.

According to some embodiments, attachment extraction and storage module 314 may determine whether to extract file classification information for the email attachment. The determination may be based at least in part on a determination of whether an email attachment type is a file type for which file classification information is stored internal to the email attachment or external to the email attachment. According to some embodiments, if file classification information is internal to a file and it is determined that it may be retrieved later, retrieval may be deferred.

According to some embodiments, attachment extraction and storage module 314 may retrieve file classification information whether the file classification information is internal to the file or external to the file. For example, attachment extraction and storage module 314 may use an API or other method to retrieve classification information stored in a file itself. Attachment extraction and storage module 314 may have information identifying a format, location, and other access information for file classification information based on a file type or other attributes. For example, a certain file type may store file classification information such as, for example, file classification tags or metadata in the same place and the same format for every file (e.g., a file type of "xyz" may store file classification tags in a specific field header of a file in XML format, a second file type may use an ordered list or a string to store classification information). Attachment extraction and storage module 314 may contain a lookup table or other data structure mapping one or more file attributes (e.g., a file type) with access information permitting retrieval of file classification information.

Attachment extraction and storage module 314 may also retrieve file classification information for an email attachment from storage external to the email. For example, storage external to the email may include or more of cloud-based storage, database storage, and a file system Alternate Data Stream (ADS).

Retrieved file classification information may be stored by attachment extraction and storage module 314 in one or more locations so that such information is accessible for later use. For example, attachment extraction and storage module 314 may store file classification information in Messaging Application Programming Interface (MAPI) properties of the email. According to some embodiments, attachment extraction and storage module 314 may store file classification information in other locations such as a database and/or network accessible storage.

Attachment retrieval module 316 may receive and handle requests for file classification information. Attachment retrieval module 316 may retrieve file classification information from one or more locations (e.g., an email attachment, MAPI properties of an email, and/or an external electronic storage location) in response to a request for such information (e.g., from backup management software, encryption software, archive management software, indexing and/or search software, replication software, and other applications).

Error logging and reporting module 318 may produce logs, reports, or other information associated with file classification information retention.

Figure 4:
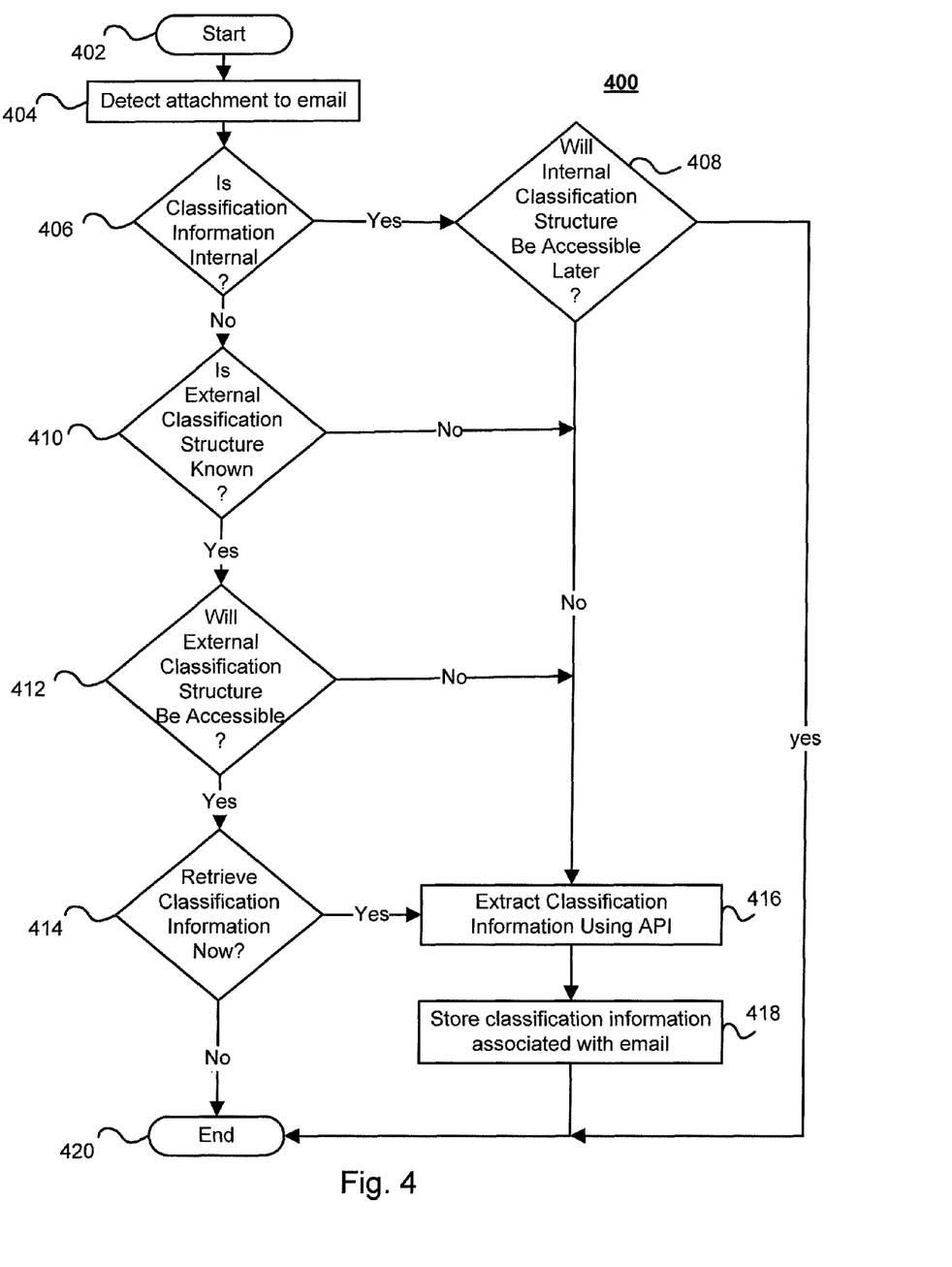
FIG. 4 depicts a method for file classification information retention in accordance with an embodiment of the present disclosure.

Referring to FIG. 4, there is depicted a method 400 for file classification information retention in accordance with an embodiment of the present disclosure. At block 402, the method 400 may begin.

At block 404, detection of an attachment of a file to an email, an instant message, a web posting, or other electronic communication may occur.

At block 406, an attachment may be analyzed to determine whether it is an attachment storing file classification information in the file itself. For example, attributes of an email attachment, such as a file type may be analyzed to determine whether the email attachment contains internal file classification information. In some embodiments, a field in a header of a file may be examined to determine whether the file contains internal file classification information. If the file contains internal file classification information the method 400 may continue at block 408. If the file classification information is external, the method 400 may continue at block 408.

At block 408, analysis may be performed to determine whether internal file classification information will be accessible later. For example, some internal file classification information may need to be retrieved at the time of attachment to an email because an API or other method of retrieving the information may not be available later. Some files may be of a known structure and internal file classification information may readily be retrieved later. According to some embodiments, if internal file classification information may be retrieved later, the retrieval of such information may be deferred and the method 400 may end at block 420. According to one or more embodiments, file classification information may be retrieved as soon as an attachment is detected regardless of the structure and/or location of classification information. If internal file classification information may not be accessible later, the method 400 may continue at block 416.

At block 410, analysis may be performed to determine whether an external file classification structure is known. For example, an email attachment may use FCI which may provide an API for retrieving external file classification information (e.g., from a file system Alternate Data Stream (ADS)). The structure of the classification information may not be available to third party products (e.g., archive management software) and retrieval may need to be performed at the time of detection using an API. If the structure of the external file classification information is known, the method 400 may continue at block 412. If the structure of the external file classification information is not known, the method 400 may continue at block 416.

At block 412, analysis may be performed to determine whether file classification information, stored externally to an attachment, will be accessible for applications requesting classification information later. If external file classification information will be accessible later, the method 400 may continue at block 414. If external file classification information will not be accessible later, the method 400 may continue at block 416.

At block 414, a determination may be made as to whether to retrieve file classification information at the time of detection of the file attachment or to defer retrieval. According to some embodiments, the determination may be made based on one or more of user preferences, a CPU utilization level of a mail server, a memory utilization level of a mail server, a type of file attachment, or other factors. If retrieval of file classification information is deferred, the method 400 may end at block 420. If retrieval of file classification information is to be performed, the method 400 may continue at block 416.

At block 416, file classification information may be extracted. According to some embodiments, extraction may call a API which may extract information from a file itself or from external electronic storage.

At block 418, retrieved file classification information may be stored in one or more locations so that such information is accessible for later use. For example, file classification information may be stored in Messaging Application Programming Interface (MAPI) properties of the email. According to some embodiments, file classification information may be stored in other locations such as a database and/or network accessible storage.

At block 420, the method 400 may end.

Figure 5:
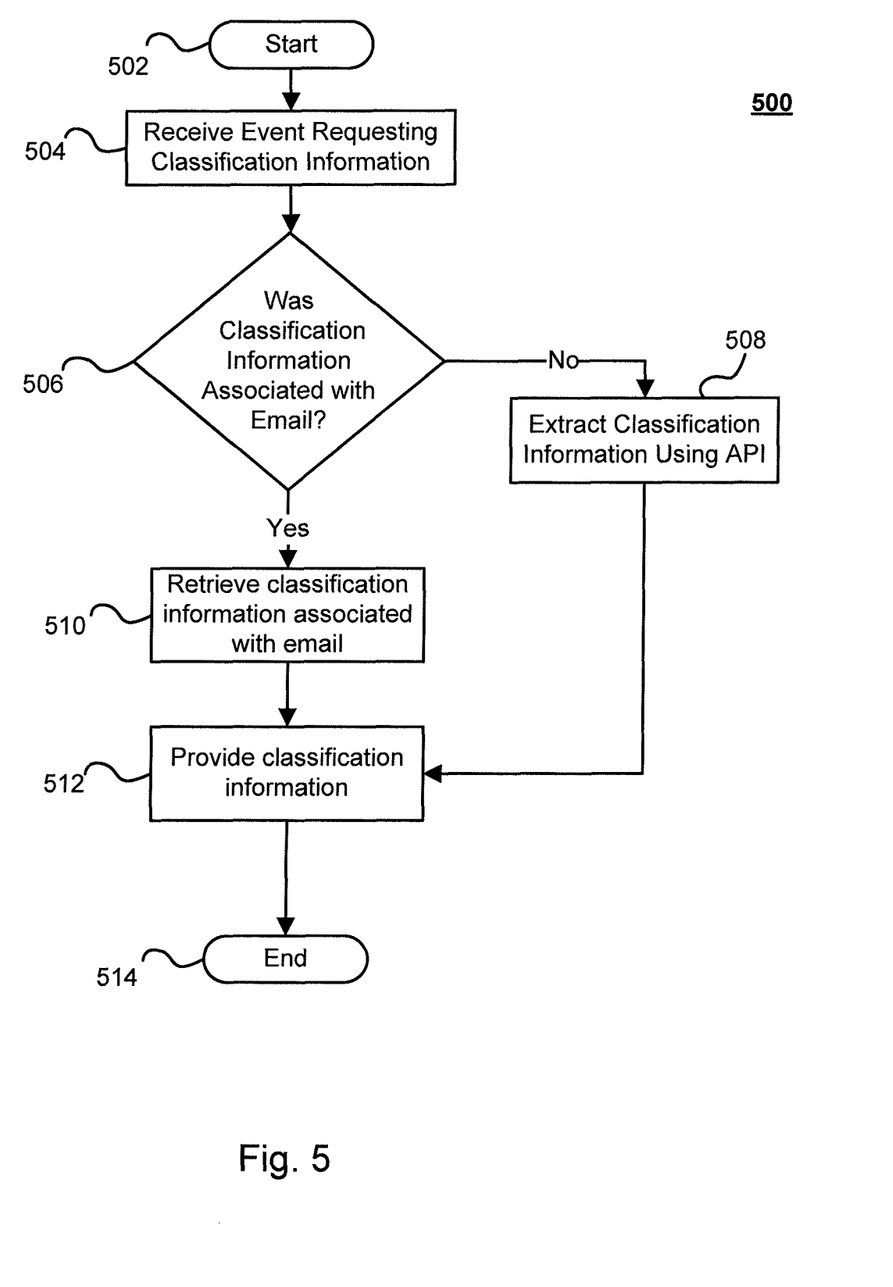
FIG. 5 depicts a method for retained file classification information retrieval in accordance with an embodiment of the present disclosure.

Referring to FIG. 5, there is depicted a method 500 for retained file classification information retrieval in accordance with an embodiment of the present disclosure. At block 502, the method 500 may begin.

At block 504, a request for file classification information may be received.

At block 506, it may be determined whether classification information is associated with the email. For example, file classification information may have been inserted into MAPI properties of an email, inserted into a database and associated with an email identifier, saved to network accessible storage and associated with an email, or otherwise saved in electronic storage external to the email and associated with the email. If file classification information was associated with the email, the method 500 may continue at block 510. If file classification information was not associated with the email, it is assumed to be stored in the attachment or file itself, and the method 500 may continue at block 508.

At block 508, classification information internal to a file may be extracted using an API.

At block 510, classification information associated with an email may be retrieved. For example, the MAPI properties of an email may be parsed to retrieve previously stored file classification information.

At block 512, the classification information may be provided to a requestor. A requestor may include, for example, data loss prevention software, anti-virus software, encryption software, archive management software, backup management software, replication software, and indexing software. For example, encryption software may use file classification information to determine a level of encryption to apply to a file. Archive management software may use file classification information to determine whether to store a file in near-line storage, in off-line storage, or on another storage platform. Archive management software may also use file classification information to determine how long to retain a file or whether a file may be expired.

At block 514, the method 500 may end.

At this point it should be noted that file classification information retention in accordance with the present disclosure as described above typically involves the processing of input data and the generation of output data to some extent. This input data processing and output data generation may be implemented in hardware or software. For example, specific electronic components may be employed in a file classification information retention module or similar or related circuitry for implementing the functions associated with file classification information retention in accordance with the present disclosure as described above. Alternatively, one or more processors operating in accordance with instructions may implement the functions associated with file classification information retention in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for file classification information retention comprising:
   receiving an indication of creation of an attachment to an electronic communication prior to sending of the electronic communication;
   determining, using at least one computer processor, whether to extract file classification information for the attachment, wherein the determination is based at least in part on whether the file classification information is stored internal or external to the attachment and whether the file classification information will be accessible later;
   extracting the file classification information prior to sending the electronic communication if the file classification information will not be accessible later; and
   in the event file the classification information is extracted, storing the extracted file classification information for the attachment in association with the electronic communication.

2. The method of claim 1, wherein the file classification information comprises information stored using File Classification Infrastructure (FCI).

3. The method of claim 1, wherein the attachment comprises an email attachment and further wherein the determination comprises a determination of whether the email attachment is a type for which file classification information is stored internal to the email attachment, wherein file classification information is extracted for an email attachment having file classification information stored external to the email attachment.

4. The method of claim 1, wherein file classification information is extracted for the attachment using an API.

5. The method of claim 1, wherein the electronic communication comprises an email and further wherein storing the extracted file classification information in association with the email comprises storing the information in Messaging Application Programming Interface (MAPI) properties of the email.

6. The method of claim 1, wherein file classification information is extracted from storage external to the electronic communication and the storage external to the electronic communication comprises at least one of: cloud-based storage, database storage, and a file system Alternate Data Stream (ADS).

7. The method of claim 1, wherein the attachment comprises an attachment having an extension of a Office Application and the file classification information is extracted from the attachment.

8. The method of claim 1, wherein the attachment comprises a third party application using a File Classification Infrastructure (FCI) API to store file classification information internal to the attachment.

9. The method of claim 1, further comprising:
   receiving a request for the file classification information associated with the electronic communication;
   retrieving the file classification information associated with the electronic communication; and
   providing the file classification information to a requester.

10. The method of claim 9, wherein the requester comprises at least one of: data loss prevention software, anti-virus software, encryption software, archive management software, backup management software, and indexing software.

11. The method of claim 9, wherein retrieving the file classification information associated with the electronic communication comprises retrieving the file classification information from MAPI properties associated with the electronic communication.

12. The method of claim 9, wherein retrieving the file classification information associated with the electronic communication comprises retrieving the file classification information from the attachment.

13. The method of claim 9, wherein retrieving the file classification information associated with the electronic communication comprises retrieving the file classification information from electronic storage external to the electronic communication and the attachment.

14. The method of claim 1, wherein the file classification information is used for at least one of: determining an expiration date of the email; determining an archival storage platform for the electronic communication; determining a backup storage platform for the electronic communication; determining an encryption level for the electronic communication; making a replication decision for the electronic communication; and making a security decision for the electronic communication.

15. At least one non-transitory processor readable storage medium for storing a computer program of instructions configured to be readable by at least one processor for instructing the at least one processor to execute a computer process for performing the method as recited in claim 1.

16. An article of manufacture for file classification information retention, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
   receive an indication of creation of an attachment to an electronic communication prior to sending of the electronic communication;
   determine whether to extract file classification information for the attachment, wherein the determination is based at least in part on whether the file classification information is stored internal or external to the attachment and whether the file classification information will be accessible later;
   extract the file classification information prior to sending the electronic communication if the file classification information will not be accessible later; and
   in the event the file classification information is extracted, store the extracted file classification information for the attachment in association with the electronic communication.

17. A system for file classification information retention comprising:
   one or more processors communicatively coupled to a network; wherein the one or more processors are configured to:
   receive an indication of creation of an attachment to an electronic communication prior to sending of the electronic communication;
   determine whether to extract file classification information for the attachment, wherein the determination is based at least in part on whether the file classification information is stored internal or external to the attachment and whether the file classification information will be accessible later;
   extract the file classification information prior to sending the electronic communication if the file classification information will not be accessible later; and in the event the file classification information is extracted, store the extracted file classification information for the attachment in association with the electronic communication.

18. The system of claim 17, wherein the attachment comprises an email attachment and further wherein the determination comprises a determination of whether the email attachment is a type for which file classification information is stored internal to the email attachment, wherein file classification information is extracted for an email attachment having file classification information stored external to the email attachment.

19. The system of claim 17, wherein the electronic communication comprises an email and further wherein storing the extracted file classification information in association with the email comprises storing the information in Messaging Application Programming Interface (MAPI) properties of the email.

20. The system of claim 17, wherein file classification information is extracted from storage external to the electronic communication and the storage external to the electronic communication comprises at least one of: cloud-based storage, database storage, and a file system Alternate Data Stream (ADS).

* * * * *